June 30, 1964     W. D. NOVAK     3,139,090

FILE CARD PACK OPENING APPARATUS

Filed April 15, 1959     8 Sheets-Sheet 1

INVENTOR
WARREN D. NOVAK

BY

ATTORNEY.

June 30, 1964 W. D. NOVAK 3,139,090
FILE CARD PACK OPENING APPARATUS
Filed April 15, 1959 8 Sheets-Sheet 2
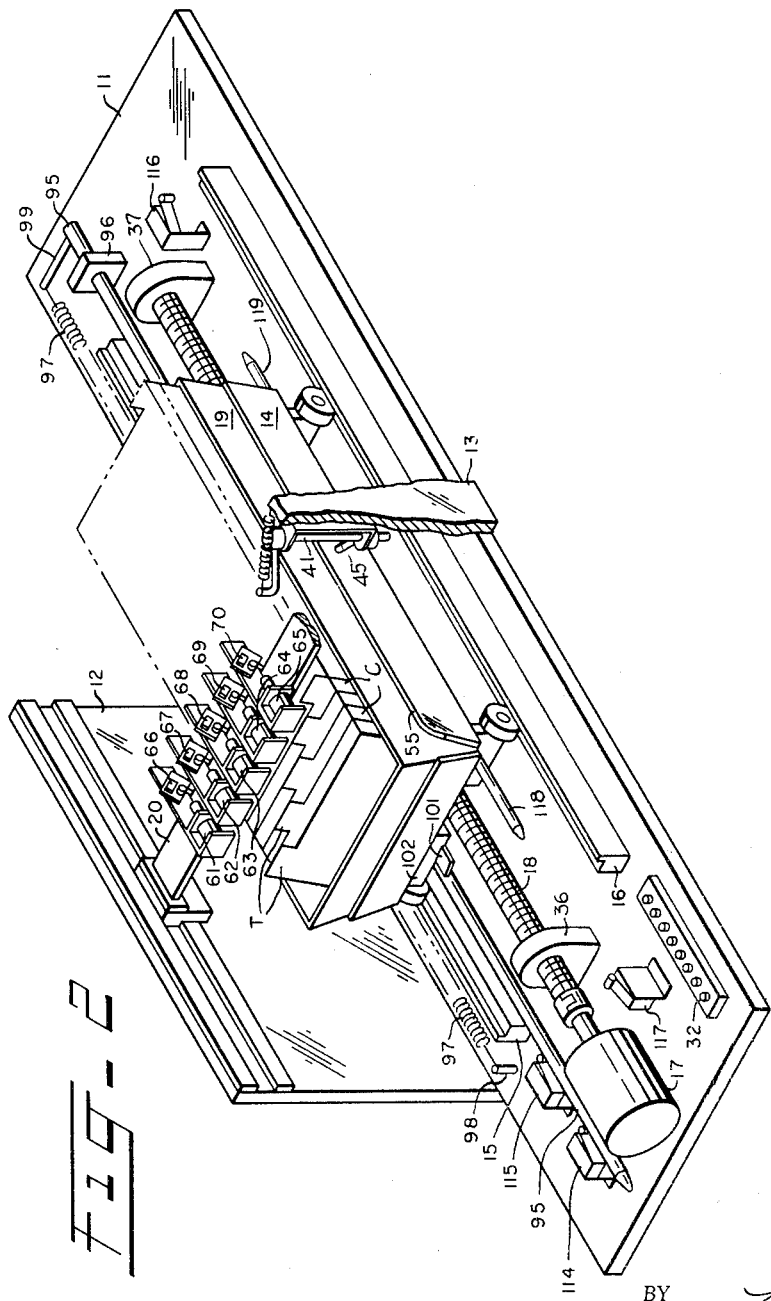
INVENTOR
WARREN D. NOVAK
BY
ATTORNEY.

June 30, 1964 W. D. NOVAK 3,139,090
FILE CARD PACK OPENING APPARATUS
Filed April 15, 1959 8 Sheets-Sheet 3

INVENTOR.
WARREN D. NOVAK
BY
ATTORNEY.

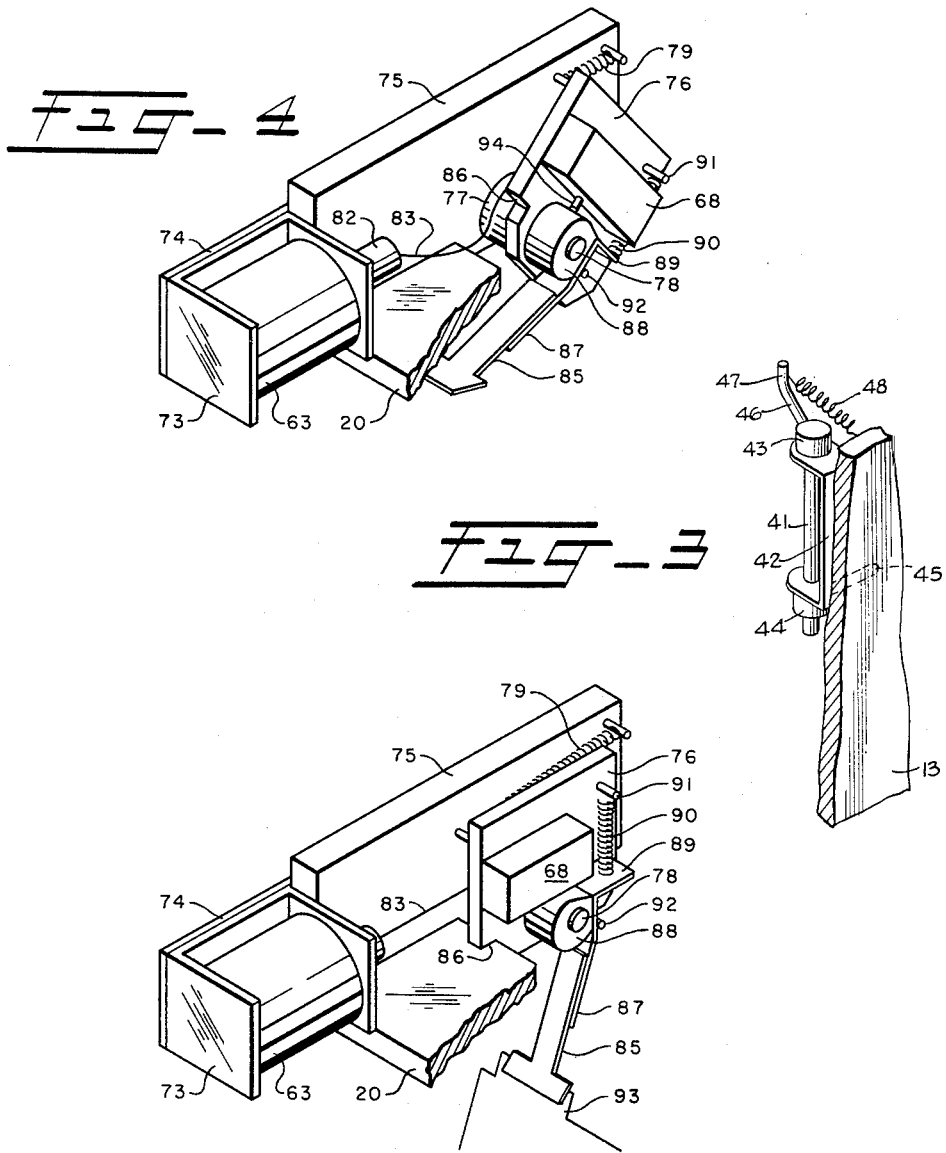

INVENTOR.
WARREN D. NOVAK

INVENTOR.
WARREN D. NOVAK

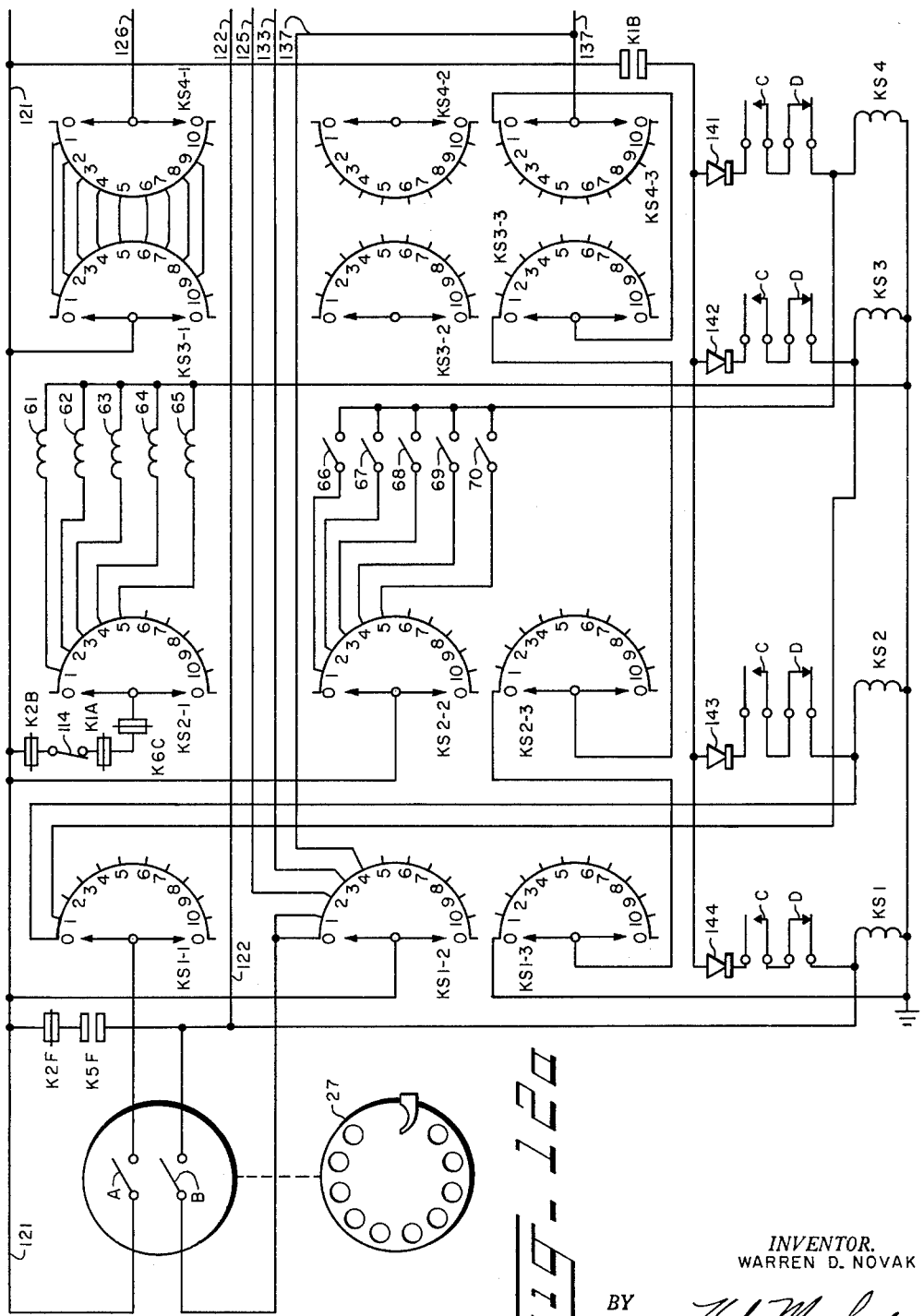

June 30, 1964   W. D. NOVAK   3,139,090
FILE CARD PACK OPENING APPARATUS
Filed April 15, 1959   8 Sheets-Sheet 8

INVENTOR.
WARREN D. NOVAK
BY
ATTORNEY.

United States Patent Office 3,139,090
Patented June 30, 1964

3,139,090
FILE CARD PACK OPENING APPARATUS
Warren D. Novak, Chappaqua, N.Y., assignor to General Precision, Inc., a corporation of Delaware
Filed Apr. 15, 1959, Ser. No. 806,700
12 Claims. (Cl. 129—16.1)

This invention relates to apparatus for selecting and viewing file cards from a remote point.

The world has a great store of information covering a vast number of different fields of knowledge. There is so much information stored in so many places that it is difficult for a worker to locate the precise information he requires for the job at hand. One widely used device to assist the worker in his search is the familiar file card which is found in libraries, government departments, business offices, schools, banks, newspaper offices and other places. Some file cards such as those used in libraries, are primarily indexes to other sources of information while other cards, such as those used by banks to record depositors' signatures, themselves contain the desired information.

As a file of cards is built up, the cards themselves and their containers become bulky and cannot be transported conveniently from place to place. Therefore, it is usually necessary for each person who wishes to use the file to go to its location to do so. A file could be utilized far more effectively if it were possible for persons at remote locations to view the file.

The kind of information stored and the usual manner of using various files is so diverse that different techniques and apparatus are required to permit remote viewing under various circumstances. For example, a bank teller at a branch bank may wish to view the card containing a depositor's signature. In this case he needs to see but a single particular card and accordingly a completely automatic system for bringing the one desired card into view on a screen would be most suitable. As another example, a newspaper editor may wish to see all of the photographs on file of a certain person so that he may select the proper picture to accompany a news item. This of course would require apparatus enabling him to browse through a number of cards.

The general approach to the problem involves presenting individual cards to the field of view of a television camera so that an image may be transmitted to a remote point. Regardless of whether the particular situation requires automatic selection of a single card or facilities to permit browsing, mechanical handling of the cards within each file drawer is required. Cards as filed in drawers or trays are usually subdivided by separator cards having tabs projecting above the main body of the pack. Card handling thus usually requires two processes, first, the selection of the group of cards behind a particular tab and the opening of the pack at that point and second, the manipulation of the individual cards between tabs. The present invention is directed to apparatus for opening the pack of cards at a preselected tab.

An object of the present invention is to provide apparatus for automatically opening a pack of file cards just behind any preselected tab separator card.

Another object is to provide apparatus which enables an operator at a remote location to divide a pack of cards into two groups at a point just behind any desired tab separator card.

Another object is to provide apparatus to enable an operator at a remote location to divide a pack of file cards successively into any of various pairs of groups of cards, each division occurring behind a preselected tab separator card and in which the tab separator cards may be selected in any desired sequence.

File cards of various sizes stored in various containers are, of course, to be found but investigation shows that a surprisingly large number of cards now in use are the standard 3" x 5" size divided by separator cards having tabs about an inch wide arranged in five columns. Therefore the invention will be described with reference to a specific embodiment designed for use with a drawer containing such cards and separators although it will be understood that the invention is equally applicable to other sizes of cards.

Briefly stated, the invention includes a longitudinally moveable carriage into which the desired file drawer of cards is placed. Above the path of forward movement of the carriage are mounted a number of tab sensing mechanisms, one for each longitudinal column of tab separator cards, for counting the upstanding tabs as the carriage moves forward. A control circuit allows an operator at a remote location to preselect the tab behind which the pack is to be opened by activating that tab sensing mechanism corresponding to the column containing the desired tab and by storing a digit corresponding to the longitudinal position of the desired tab. As the carriage moves forward, the activated sensing mechanism counts the passing tabs in the selected column and when the number counted equals the stored digit, the carriage is stopped and reversed. A finger engages the rear of the last tab counted preventing it from moving backward with the carriage, thus opening the pack, after which the finger is withdrawn and the carriage stopped.

For a clearer understanding of the invention, reference may be made to the following detailed description and the accompanying drawing, in which:

FIGURE 2 is an isometric view showing the carriage, the tab sensing mechanisms and associated apparatus;

FIGURE 3 is an isometric view of one of the pack closing devices;

FIGURE 4 is an isometric view showing a tab sensing mechanism in its inactive position;

FIGURE 5 is an isometric view simiar to FIGURE 4 but showing the tab sensing mechanism in its active position;

Figure 1:
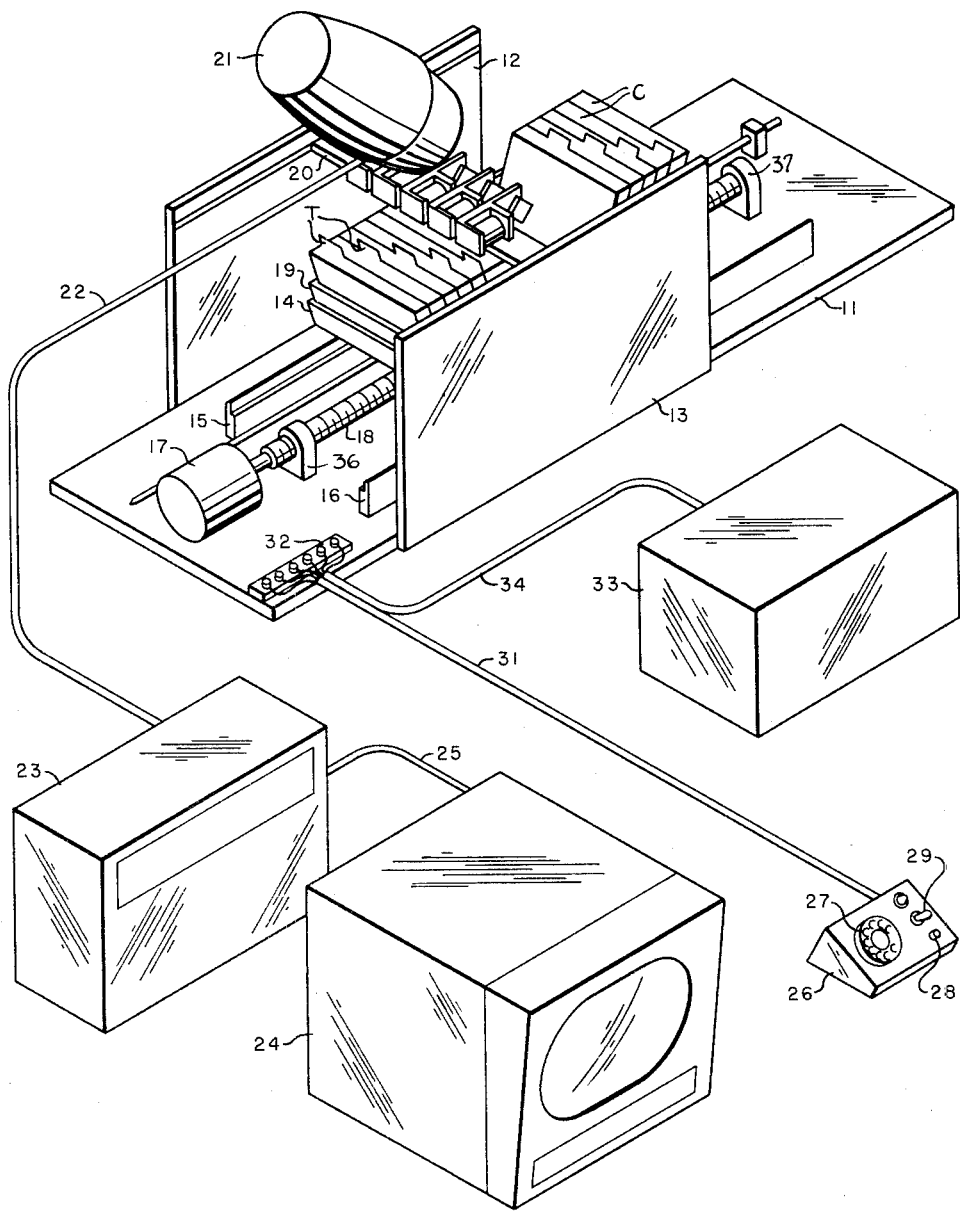
FIGURE 1 is an overall isometric view of the apparatus including the television system and the control panel.
Figure 2A:
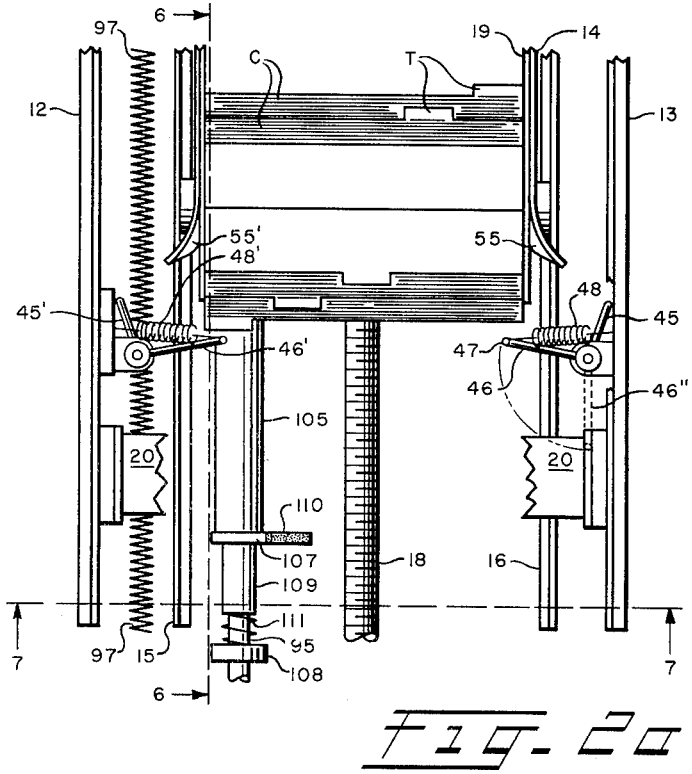
FIGURE 2a is a fragmentary plan view of the apparatus with some of the parts omitted and with the carriage at its rear limit position.
Figure 7:
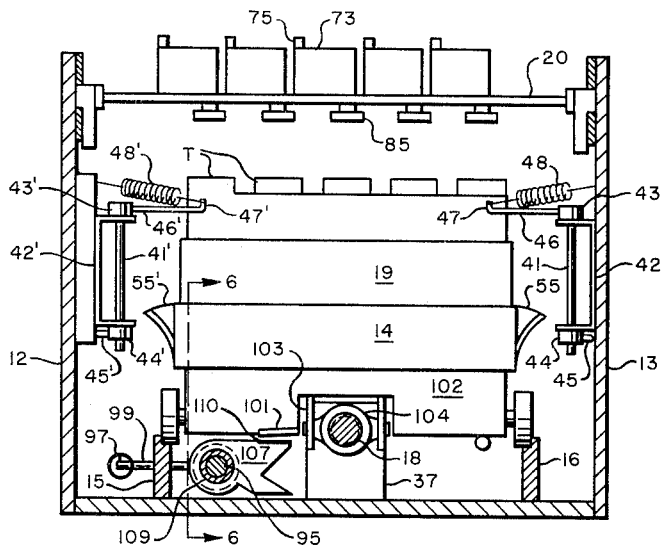
Figure 6:
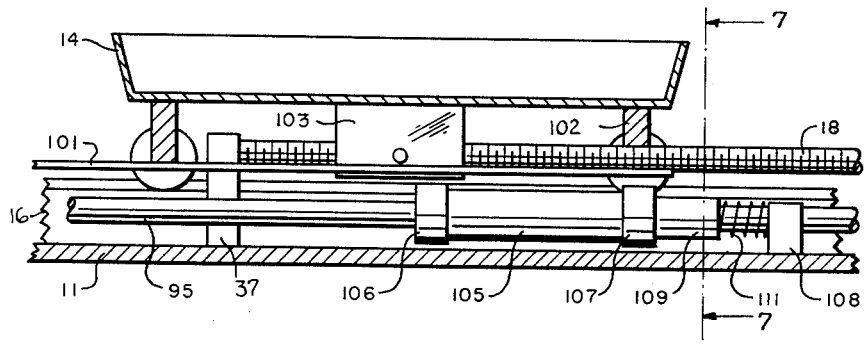
Figure 8:
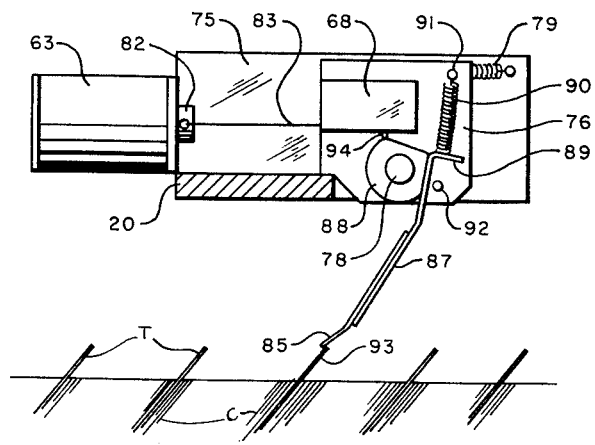
Figure 9:
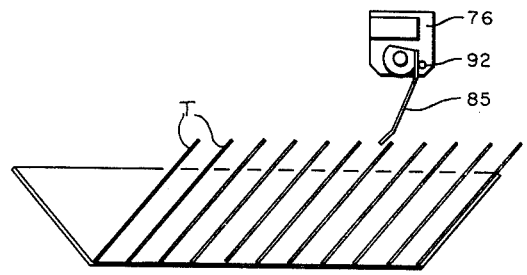
Figure 10:
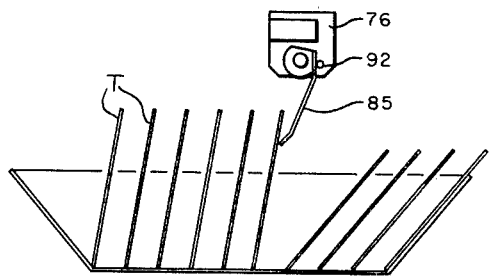
Figure 11:
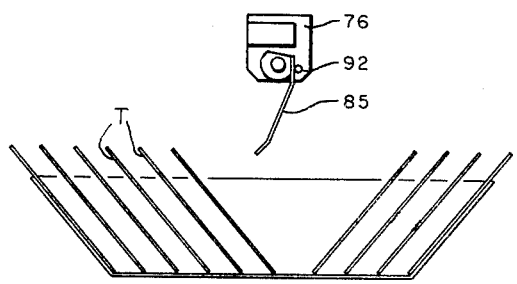
Figure 12B:
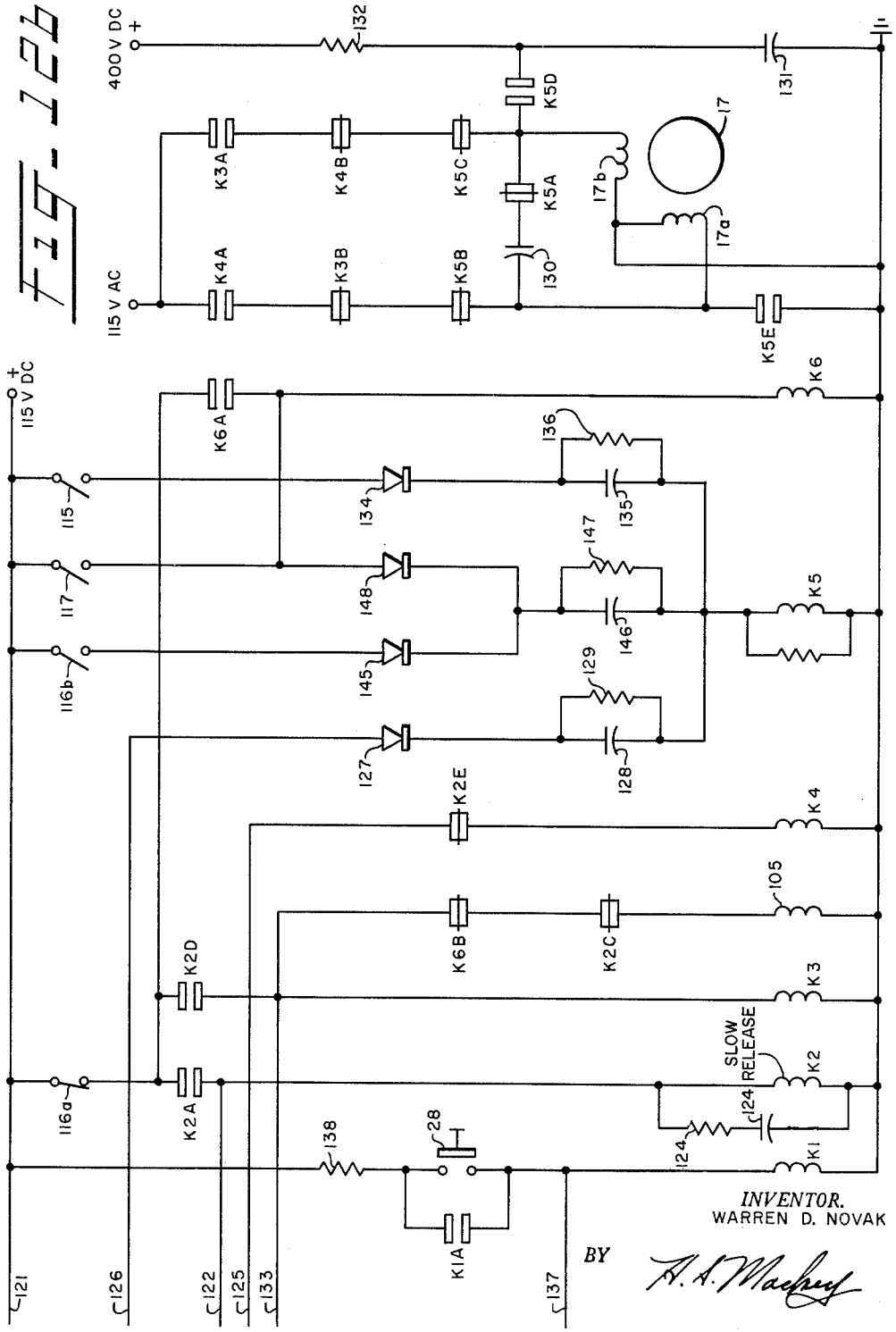

FIGURE 6 is a fragmentary cross sectional view of the carriage and the parts therebeneath taken, as shown by the line 6—6 of FIGURE 2a and the line 6—6 of FIGURE 7, from the side of the carriage which is hidden from view in FIGURES 1 and 2;

FIGURE 7 is a cross section view, taken on the line 7—7 of FIGURE 2a;

FIGURE 8 is an elevation view of a tab sensing mechanism showing the finger being rotated by a tab separator card;

FIGURES 9, 10 and 11 are diagrammatic views showing how the pack is divided by the finger; and FIGURES 12a and 12b together constitute a schematic wiring diagram of the apparatus.

Referring first to FIG. 1, there is shown a base 11 and two vertical plates 12 and 13 on which the majority of the card handling apparatus is mounted. There is shown a carriage 14 which is arranged to be moved forward and back on two tracks 15 and 16 by means of an electric motor 17 which rotates a lead screw 18, journaled in two supports 36 and 37. The lead screw 18 cooperates with a nut (not shown in FIG. 1) fastened to the bottom of the carriage 14. A drawer 19 containing the record cards C is shown placed in the carriage 14. The cards C may be of the standard 3" x 5" size and have a number of tab separator cards T interspersed among them with the upstanding tabs arranged in five columns in the usual manner. The cards C are stored loosely enough so that they may be separated at any point into two portions, a forward sloping portion and a backward sloping portion. A cross bar 20 mounted on the vertical plates 12 and 13 and positioned above the carriage 14 supports five tab sensing elements which, although not clearly visible in FIG. 1, are shown in other figures of the drawing and will be fully described in connection therewith.

A television camera 21 is mounted above the cross bar 20 by any suitable support (not shown) and is adjusted so as to include the face card of the backward sloping portion within its field of view. The camera 21 is connected by means of a cable 22 to a camera control unit 23 which contains the necessary circuitry for generating suitable voltages for operating the camera 21 and which also contains an amplifier for raising the level of the video signal from camera 21. The amplified signal is transmitted to a television monitor 24 by means of a cable 25. A control panel 26 contains a dial 27, re-set button 28, and an on-off switch 29 and is connected by means of a cable 31 to a terminal block 32 mounted on the base 11. A card control unit 33, containing power supplies, relays and other components is connected to the terminal block 32 by means of a cable 34. The base 11 with its card handling equipment and the camera 21 are preferably located near the storage area of the cards while the monitor 24 and the control panel 26 may be installed at any desired remote location. The camera control unit 23 and the card control unit 33 may be placed in any convenient out of the way spot.

In operation, the librarian places the desired drawer 19 of cards into the carriage 14 which at this time is preferably at its rearmost position, that is, to the upper right as viewed in FIG. 1. Upon receiving notification that the drawer is in the carriage, the operator at the remote location takes control by turning the switch 29 to the "on" position and then opens the pack behind any desired tab separator card. For example, if he wishes to open the pack behind a tab located in the third column six tabs from the front he merely dials the two digits 3 and 6 whereupon the carriage moves forward, the proper tab sensing mechanism counts the tabs passing beneath and, when six tabs have passed, the carriage is reversed in direction, a finger engages the sixth tab thereby opening the pack and finally the carriage is automatically stopped in the proper position so that the camera 21 focuses upon the face card of the backward sloping portion.

An actual installation would, of course, include additional apparatus for manipulating the individual cards between tab separators so as to bring any desired card into the field of view of the camera. For example, such additional apparatus might comprise a reciprocating vacuum orifice as described in the copending application of Robert D. Conkwright and Warren D. Novak, Serial No. 792,491, filed February 11, 1959, entitled "Remote Card Selecting and Viewing Apparatus," now Patent No. 2,994,740. As another example, the camera 21 could be turned to view a spot above the file drawer and apparatus provided for abstracting individual cards from the drawer and holding them at that spot. However, such card handling apparatus is not a part of the present invention and the instant description will be confined to the apparatus for opening the pack behind the desired tab.

Turning now to FIG. 2, which is a general view of the apparatus, there is shown a device for closing the pack of cards at the start of operations so that all of the cards lie in the backward sloping position. As shown in FIGS. 2 and 3, this device comprises a vertical rod 41 mounted on and freely rotatable about two horizontal tab portions of a bracket 42 which in turn is fastened to the vertical plate 13. Collars 43 and 44 are fastened to the rod 41 above and below the upper and lower tab portions of the bracket 42 so as to hold the rod 41 in position. A rod 45 is fastened to the collar 44 and extends horizontally therefrom. Another rod 46 fastened to the collar 43 extends horizontally and has an upturned end portion 47.

A spring 48 extends between the upturned end portion 47 and the plate 13 so as to urge the rods 41, 45 and 46 to either one of two stable positions. The first position is that shown in FIGURES 2a, 3 and 7 in which the rod 45 bears against the plate 13. As best shown in FIGURES 2a and 7, in this position the rod 46 and its upturned end portion 47 extend into the path of forward movement of the cards and carriage at a height above the carriage but below the tab level so as to engage the first card as the carriage moves forward. The second position is that shown in FIGURE 2 in which the rod 46 is swung out of the path of movement of the carriage (as also shown dotted by the reference character 46" in FIGURE 2a) and in which the rod 45 bears against the side of the carriage.

To understand the operation of the pack closer, let it be assumed that the carriage 14 is at the rear limit position (the upper right as viewed in FIGS. 1 and 2), that the pack of cards is divided into two portions one sloping toward the front and the other sloping toward the rear, and that the carriage has just started to move forward. At this time the pack closer will be in the position shown in FIGURES 2a, 3 and 7. As the carriage moves forward, the first card in the pack, which is sloping forward, will engage the upstanding end portion 47 of the rod 46. The spring 48 is of sufficient strength so that as the carriage moves forward the cards are pushed backward until they fall to the backward sloping position, the rod 46 and its end portion 47 remaining in the same position. As the carriage moves further forward, the first card, which is now sloping backward, will again engage the end portion 47 but now the rod 46 will be moved against the urging of the spring 48 until dead center position is passed at which time the spring 48 will snap the parts into the position shown in FIG. 2.

It is noted that with the parts in the position shown in FIG. 2 the rod 45 extends so as to bear against the side of the carriage 14. When the carriage 14 is returned to the rear limit position, a projection, which may be as shown merely a bent out corner 55 of the carriage, engages the rod 45 thereby snapping the parts to the position shown in FIG. 3, thus resetting the device for the pack closing operation the next time the carriage 14 moves forward.

Although but one pack closing mechanism is visible in FIG. 2, there is a second similar mechanism on the other side of the carriage, as shown in FIGURES 2a and 7. The parts of the second mechanism are denoted by primed reference characters corresponding to the unprimed reference characters denoting the parts of the first mechanism and both devices operate substantially simultaneously to close the pack.

Visible in FIG. 2 are portions of the five identical tab sensing mechanisms, one for each column of tabs, mounted on the cross bar 20, above the respective columns of tabs. There can be seen five solenoids 61, 62, 63, 64 and 65 and five small switches 66, 67, 68, 69 and 70, one solenoid and one switch for each tab sensing mechanism.

One of these mechanisms is shown in detail in FIGS. 4 and 5, and, as shown therein, the solenoid 63 is mounted in a U-shaped bracket 73 fastened to a strap 74 secured to a longitudinal bar 75 which in turn is fastened to the cross bar 20. A generally square plate 76 is fastened to a sleeve 77 encircling a stud 78 which is fastened to the longitudinal bar 75 so that the sleeve 77 and plate 76 are freely rotatable about the stud 78 as a pivot. The plate 76 is normally held in the position shown in FIG. 4 by means of a spring 79 but may be rotated through approximately fifty-five degrees to the position shown in FIG. 5 by energization of the solenoid 63, the core 82 of which is connected to a flexible wire 83 wound around and fastened to the sleeve 77. In the position shown in FIG. 4 a finger 85, the mounting of which will be explained below, bears against the under side of the cross bar 20 thereby limiting rotation in the clockwise direction while in the position shown in FIG. 5 a shoulder portion 86 on the plate 76 bears against upper surface of the cross bar 20 thus limiting rotation in the counterclockwise direction.

The above mentioned finger 85 is fastened to a strap 87 which in turn is fastened to one flattened surface of a sleeve 88 which is mounted to be freely rotatable about the stud 78. The strap 87 has a bent out tab portion 89 to which one end of a spring 90 is fastened, the other end being fastened to a stake 91 secured to the plate 76. The spring 90 urges the sleeve 88, the strap 87, and the finger 85 to their counterclockwise limit of rotational movement which is attained when the portion of the strap 87 fastened to the sleeve 88 bears against a stake 92 fastened to the plate 76, as shown in both FIGS. 4 and 5. Shown in FIG. 5 is a tab separator card 93 the upstanding tab portion of which is just engaging the finger 85 but has not yet rotated it.

The small switch 68 is fastened to the plate 76 and its actuator 94 extends downward and engages the sleeve 88 in the region of the transition from the upper flat portion to the leftward circular portion. As best shown in FIG. 8, the forward movement of the tab separator card rotates the finger 85, the strap 87 and the sleeve 88 in a clockwise direction against the urging of the spring 90 away from the stake 92. During this movement the sleeve 88 acts as a cam and depresses the actuator 94 of the switch 68. It is noted that at this time, as shown in FIG. 8, the solenoid 63 is energized thus holding the plate 76 in its most counterclockwise position.

Returning now to FIG. 2, there is shown a long brass rod 95 mounted by two supports, one of which is shown at 96 in FIG. 2, which permit the rod to slide freely lengthwise and to rotate slightly. A long spring 97 has one end connected to a stake 98 secured to the base 11 and the other end connected to a pin 99 fastened to one end of the rod 95 so as to urge the rod forward. Above and to one side of the rod 95 is a steel strap 101 fastened approximately flush with the bottom surface of the carriage frame 102 but tilted slightly Referring now to FIG. 6, which shows some of the parts which are hidden from view in FIG. 2, there is shown a bracket 103 fastened to the bottom of the carriage 14 for supporting a nut 104, shown in FIGURE 7, which nut cooperates with the lead screw 18 to move the carriage. There can also be seen in FIGURE 6 a solenoid 105 wound around and fastened to the rod 95 and having two pole pieces 106 and 107, one at each end. As best shown in FIG. 7, each pole piece has a portion extending beneath the strap 101 so that when the solenoid 105 is energized, the magnetic lines of force from the coil flow through the pole piece 106, the strap 101 and the pole piece 107 back to the coil thereby rotating the solenoid 105 and the rod 95 slightly and attracting the pole pieces 106 and 107 into contact with the strap 101 thus magnetically latching the rod 95 to the carriage 14. In some cases it may be desirable to cover the pole pieces 106 and 107 with a thin layer 110 of non-ferrous material such as cellulose tape so that upon deenergization of the solenoid 105 the remanent magnetism will not be strong enough to prevent prompt disengagement of the pole pieces and the strap 101.

Also shown in FIGURE 6 is the second support 108 which not only supports the rod 95 while allowing it to slide freely axially but which also serves to establish a rest or normal axial position of the rod 95. Cooperating with the support 108 is a collar 109 fastened to the pole piece 107 and a spring 111 fastened to the collar 109. It will be recalled from the description of FIGURE 2 that the long spring 97 (shown in FIGURE 2) urges the rod 95 forward, that is, to the right as viewed in FIGURE 6. The rod 95, the solenoid 105, the pole pieces 106 and 107, the collar 109 and the spring 111 are thus urged to the right to the position shown in FIGURE 6 at which position the urging of the spring 97 is balanced by the resilience of the spring 111 which at that time abuts the support 108. As will become apparent when the operation of the apparatus is discussed, there are times when the rod 95 and the parts joined thereto, including the collar 109 and the spring 111, are moved against the urging of the spring 97 to a position to the left of that shown in FIGURE 6 and subsequent released. The purpose of the apparatus above described is twofold, first, to establish a normal or rest position of the rod 95 when it is released and second, to permit the rod 95 to be stopped gradually through the resilience of the spring 111.

The remainder of the apparatus shown in FIG. 2 will be described in connection with its operation. Let it be assumed that the carriage 14 is in the rear position, that the librarian has placed the desired file drawer in the carriage, and that control has been turned over to the operator at the remote location. After turning on the power, the operator may cause the pack to be opened behind any desired tab separator card. Considering the previous example in which the operator desired to open the pack behind the sixth tab in the third column, he need only dial the digits 3 and 6. The act of dialing initiates a series of operations the details of which will be fully explained in connection with FIGS. 12a and 12b, but for present purposes it will be sufficient to note the effect on the apparatus so far illustrated and described. First the dialing of the digit 3 activates the third sensing mechanism by energizing the solenoid 63 thereby extending the finger 85 to the position shown in FIG. 5. The dialing of the digit 6 stores this digit in the card control unit 33 and in addition energizes the motor 17 to start the carriage moving forward. If all of the cards are not already in the backward sloping position the upturned end 47 of the rod 46 will be engaged by the first card and the pack will be closed in the manner previously described. As the carriage moves forward the finger 85 will be engaged by successive tabs each of which rotates the finger forward as shown in FIG. 8 and then slides under the finger allowing it to return to its former position during which operation the switch 68 is actuated. After six switch actuations the motor 17 is deenergized and dynamic braking applied thereby stopping the carriage quickly. The solenoid 105 (FIG. 6) is now energized clamping the rod 95 to the carriage and the motor is reversed starting the carriage moving backward. At this time the finger 85 and the tabs are positioned as shown in FIG. 9. As the carriage moves backward the sixth tab engages the finger 85 which cannot rotate counterclockwise any further because of the stake 92. Therefore, as the carriage moves, the pack is opened as shown in FIG. 10. As the carriage continues to move backward the sixth tab and all of the cards in front of it fall to the forward sloping position as shown in FIG. 11. At this time the end of the finger 85 is still at the same height as the tabs and it is obvious that continued backward movement of the carriage would cause the sixth tab to re-engage the finger if the finger were allowed to remain in this position. However, it will be recalled that the rod 95 (FIG. 2) has been moving with the carriage 14 and very soon after the position illustrated in FIG. 11 has been reached, the end of the rod 95 will have progressed sufficiently to release the actuator of a small switch 114 mounted on the base 11. Actuation of this switch deactivates the sensing mechanism by deenergizing the solenoid 63 permitting the spring 79 to rotate the plate 76 so as to retract the finger 85 to the position shown in FIG. 4, out of the way of the tabs. The carriage 14 continues its backward movement until the face card of the backward sloping group of cards reaches the field of view of the television camera 21 (FIG. 1) at which point the end of the rod 95 (FIG. 2) has travelled sufficiently to release the actuator of a small switch 115 which action causes the motor to be deenergized, dynamic braking to be applied, and the carriage 14 to be stopped. The pack has now been opened behind the tab selected by the operator at the remote location and an image of the first card behind that tab appears on the screen of the monitor 24 (FIG. 1).

There is also shown in FIG. 2 a rear limit switch 116 actuated, when the carriage 14 reaches a rear limiting position, by a projection or rod 119 fastened to the rear of the carriage as shown. Similarly, a forward limit switch 117 is actuated, when the carriage reaches a forward limiting position, by a projection or rod 118 fastened to the front of the carriage 14 as shown. The function of these switches will be explained in connection with the circuit diagram of FIGS. 12a and 12b.

Turning now to FIGS. 12a and 12b, certain elements are shown which also appear in other figures of the drawing. In FIG. 12a there is shown the dial 27 which also appears in FIG. 1, the solenoids 61–65 and switches 66–70 of the tab sensing mechanisms, and the small switch 114 (actuated by the rod 95) which also appear in FIG. 2. In FIG. 12b there is shown the reset button 28 which also appears in FIG. 1, the motor 17 which also appears in FIGS. 1 and 2, the solenoid 105 which also appears in FIG. 6, the small switch 115 (actuated by the rod 95), and the front and rear limit switches 116 and 117 which also appear in FIG. 2. The limit switch 116 is actually a single pole double throw switch, both sections of which are utilized and which are designated as 116a and 116b in FIG. 12b. The remaining components shown in FIGS. 12a and 12b may be contained within the card control unit 33 (FIG. 1).

The dial 27 actually used in the specific embodiment being described has, as shown in FIG. 12a two switches designated "A" and "B." In the rest position of the dial both switches are open as shown in the drawing. When the operator inserts his finger at, for example, the number 5 position and turns the dial to the finger stop, both switches are closed. When the operator removes his finger, the "A" switch is opened five times during the return of the dial to its rest position while the "B" switch remains closed until the rest position is reached at which position it is opened.

Also shown in FIG. 12a are four step switches the operating windings of which are designated as KS1, KS2, KS3 and KS4, each of which has three decks of switches, each with ten contacts, not all of which are used. The decks of switch KS1, for example, are designated KS1–1, KS1–2 and KS1–3 and the remaining decks are similarly designated. The step switches are of conventional construction in which each switch is advanced one position in response to a voltage pulse applied to its operating winding, the actual movement occurring when the voltage is removed. Ten pulses advance the switch from the zero position to the tenth position and the eleventh pulse re-establishes the zero position. In addition to the above-mentioned decks of switches, each step switch is equipped with two auxiliary contacts designated C and D. Contact C is open when the switch is in the zero position, as shown in the drawing, but is closed in all other positions of the switch. Contact D is closed when the switch is in the zero position and is opened and reclosed during each stepping operation of the switch. The switches KS1, KS2 and KS3 are assumed to advance step by step in the clockwise direction and, while switch KS4 is actually identical to switches KS1, KS2 and KS3 it is shown schematically as advancing in the counter-clockwise direction, solely to simplify the schematic diagram.

At the start of operations the carriage is in its rear position and the librarian inserts the selected file drawer into the carriage and turns control over to the operator at the remote location. For example, assume that it is desired to break open the pack behind the sixth tab in the third column. The operator dials the digits 3 and 6, the three selecting the third column of tabs and the six selecting the sixth tab in that column. Consider now the operation in detail.

As the digit 3 is dialed, the dial switch B closes and voltage flows from the D.C. control power supply bus 121 through switch KS1–2, which is in the zero position, through dial switch B to the coil KS1 but no operation of KS1 occurs at this time. Voltage is also applied through KS1–2, the dial switch B, and the conductor 122 to the coil of relay K2 (FIG. 12). Relay K2 does not seal itself in through contacts K2A because the rear limit switch 116a is now open. For the same reason, closure of the contact K2D does not energize relay K3. As the dial returns to zero, three pulses pass through dial switch A and through switch KS1–1 in the zero position to the coil KS2, thereby stepping switch KS2 to the third position. As shown, the finger solenoids 61, 62, 63, 64 and 65 each have one terminal connected to positions 1–5 respectively of switch KS2–1 while the other terminals of these solenoids are grounded. The armature of KS2–1 is connected through normally closed contacts K6C and K1A, normally closed microswitch 114, and normally closed contact K2B to the 115 v. D.C. supply, but no solenoids are immediately energized since contact K2B has been opened. At the same time the second deck of switch KS2, designated KS2–2 is also stepped to its number three position. The microswitches 66, 67, 68, 69 and 70, associated with the same tab sensing mechanisms as the solenoids 61, 62, 63, 64 and 65 respectively, each have one terminal connected to positions 1–5 respectively of the switch KS2–2 while the other terminals are connected together and to the coil of step switch KS4. The arm of switch KS2–2 is connected to the D.C. supply conductor 121.

When the dial 27 returns to its rest position, dial switch B opens thereby deenergizing relay K2 which releases after a short time delay effected by means of the series combination of a resistor 123 and a capacitor 124 which shunts the coil K2. The release of relay K2 closes contact K2B thereby energizing the solenoid 63 which lowers the finger 85 (FIGS. 4, 5 and 8) to its active position. The opening of dial switch B also deenergizes coil KS1 which causes all decks of switch KS1 to be stepped from their zero to their number one positions.

As the digit six is dialed, operation of dial switch A applies voltage pulses through switch KS1–1, which is now in the number one position, to the coil KS3 which is thereby stepped to its number six position. The first deck, KS3–1, has its arm connected to the D.C. supply bus 121 and has its number 1 to 10 contacts connected to the number 1 to 10 contacts respectively of the first deck, KS4–1, of the step switch KS4.

When the dial returns to rest after the dialing of the second digit, in this example the digit six, the dial switch B operates to step the switch KS1 to its number two position. Control power now flows through the arm of KS1–2, the number two terminal, the conductor 125, and the normally closed contact K2E to the coil of relay K4 which is thereby picked up. Contact K4A is closed, contact K4B is opened, alternating current flows directly to winding 17a and through the motor capacitor 130 to the winding 17b, the motor starts to rotate, and the carriage moves forward away from the rear position. It will be recalled that the finger 85 has ben swung into its operative position and as the carriage moves forward successive tabs in the third column engage the finger, each tab causing it to rotate clockwise, as viewed in the drawing. As each tab passes the finger, the finger is returned to its former position by the spring 90 and as it returns it operates the microswitch 68. Each operation of the microswitch 68 causes a voltage pulse to be applied through the arm of KS2–2, the number three terminal, and the microswitch 68, to the coil of the step switch KS4, each pulse stepping this relay once. When KS4 has been stepped to its number six position, control power flows through the armature of KS3–1, its number six terminal, the number six terminal of switch KS4–1 and its armature, the conductor 126, the diode 127, and the capacitor 128 to the coil of relay K5. The capacitor 128 is normally maintained in a discharged condition by a comparatively large shunting resistor 129 and is of such capacity so that the charging current is sufficient to operate the brake relay K5 momentarily.

Energization of the brake relay K5 has a number of effects. Normally closed contacts K5A, K5B and K5C are opened thereby disconnecting the motor capacitor 130 and removing the excitation from the motor regardless of whether it has been previously connected for forward or reverse rotation. Normally open contacts K5D and K5E are closed thereby applying dynamic braking to the motor. The closure of contact K5E short circuits the motor winding 17a while closure of contact K5D applies a pulse of direct current to the winding 17b. The direct current pulse is obtained by the discharge of a 200 μfd. capacitor 131 which is connected across a 400 volt D.C. supply through a 4000 ohm resistor 132. Between operations of the brake relay K5 the capacitor is charged to 400 volts and when the contact K5D is closed it discharges through the motor winding 17b. The resistor 132 limits the current from the D.C. supply through the winding 17b after the capacitor has discharged to about one hundred milliamperes and similarly limits the charging current of the capacitor 131. This dynamic braking circuit stops the motor within about two revolutions. At about the time the capacitor 131 becomes completely discharged, the capacitor 128 becomes sufficiently charged so that the charging current is insufficient to hold the relay K5 and it drops out.

Energization of the brake relay K5 also closes the normally open contact K5F (FIG. 12a) thereby allowing control power to flow through this contact and through the normally closed contact K2F to the coil of the step switch KS1 which, when the brake relay K5 drops out opening contact K5F, is advanced to its number three position. As the arm of the second deck, KS1-2, leaves the number two position relay K4 drops out opening contact K4A and closing contact K4B, and when the arm engages the number three terminal, control power flows through the conductor 133 to the coil of relay K3 (FIG. 12b). When relay K3 picks up, contact K3A is closed, contact K3B is opened and, since contacts K4B, K5A, K5B and K5C are now closed while contacts K4A, K5D and K5E are now open, the motor is energized to move the carriage back toward the rear position.

At the same time that relay K3 is energized, control power flows from the conductor 133 through the normally closed contacts K6B and K2C to the magnet coil 105, which, it will be recalled, is fastened to the rod 95. As the coil 105 is energized the rod is magnetically clamped to the carriage so that as the carriage moves the rod moves with it against the urging of spring 97 (FIG. 2).

It will be recalled that each time a tab card rotated the finger 85 in the counterclockwise direction, the return of the finger actuated the microswitch 68. Therefore, after six actuations of the microswitch 68 the finger was located between the sixth and seventh tabs as shown in FIG. 9. As the carriage now moves toward the rear position the sixth tab will engage the finger 85 and since it cannot rotate counterclockwise continued movement of the carriage will cause the pack of cards to be opened as shown in FIG. 10. As the carriage moves further, the cards will fall forward ahead of the finger as shown in FIG. 11. It can be seen that at this point it is necessary to retract the finger to prevent the now forward slanting tab from jamming against the finger as the carriage continues to move backward. Therefore, just at this point the rod 95 leaves the actuator of the microswitch 114 allowing the switch to open. As shown in FIG. 12a, the opening of switch 114 removes the energization from the solenoid 63 allowing the spring 90 to retract the finger 85.

As the carriage 14 and rod 95 move still further, the rod 95 releases the actuator of the microswitch 115 thereby allowing its contacts to close. Closure of the switch 115 allows control power to flow through these contacts, the diode 134, and the capacitor 135 shunted by the resistor 136 to the brake relay K5. Dynamic braking is applied as previously explained, stopping the carriage quickly. As before, contact K5F closes momentarily thereby advancing the step switch KS1 to its number four position. Control power is removed from the number three terminal of switch KS1-2 and conductor 133 thereby deenergizing relay K3 and the magnet solenoid 105. Control power is applied to the number four terminal of switch KS1-2 and to conductor 137 thereby applying a voltage to the arm of step switch KS4-3, the zero terminal of which is connected to the arm of KS3-3. The zero terminal of KS3-3 is connected to the arm of KS2-3, the zero terminal of KS2-3 is connected to the arm of KS1-3, and the zero terminal of KS1-3 is grounded. Thus, if these switches were all in their zero or home positions the control power would be short circuited but since all have been advanced to various positions this circuit has no effect at this time.

The voltage on conductor 137 also energizes the coil of the relay K1 which seals itself in by closing its normally open contact K1A which connects the coil K1 to the control power through a resistor 138. The normally open contact K1B is also closed thereby applying control power in parallel through the diodes 141, 142, 143 and 144, and the C and D contacts of each of the step switches to the coils of the step switches KS1, KS2, KS3 and KS4. Considering KS1 for a moment, control power will flow through the diode 144, the contact C (which, it will be recalled, is closed at all times except when the switch is in its zero position) and the contact D (which remains closed except for a brief period during each stepping operation) to the coil KS1. The switch is therefore advanced one position, opening contact D momentarily thereby interrupting the voltage and causing a further advance of the switch which continues to step around until the zero position is reached at which time the contact C opens and remains open. Thus the step switch KS1 is reset to its zero position and in a like fashion the switches KS2, KS3 and KS4 are reset to zero. When all switches reach zero, the switch decks KS1-3, KS2-3, KS3-3 and KS4-3 establish the circuit previously mentioned which grounds the conductor 137 and short circuits the relay coil K1 causing it to drop out. The resistor 138 limits the short circuit current to a safe value.

At this point the pack of cards has been broken open at the selected position and the carriage has been stopped in the proper position so that the television camera can view the face card. The step switches have been returned to zero so that the apparatus is ready to accept a new tab selection after the perusal of cards behind the selected tabs has been completed. Viewing of individual cards may be accomplished by any desired card manipulating device, one suitable apparatus being described in the aforementioned copending application Serial No. 792,491.

The operation of breaking open the pack behind a selected tab as above described assumed that, to start, the carriage was in the rear limit position. After the first selection is made and the pack opened, another selection may be made even though the carriage is in the viewing position. Consider the operation if the second selection be the fourth tab in the fifth column, in which case the operator would dial the number 54. As soon as the dial is moved to dial the digit five, control power flows through the switch deck KS1-2 in the zero position, the dial switch B, and the conductor 122 to relay coil K2. Relay K2 is energized and seals itself in through contact K2A because the rear limit switch 116a is closed inasmuch as the carriage is in the viewing position. Contact K2D also closes energizing relay K3 which energizes the motor and starts the carriage moving toward its rear position. The opening of contact K2C prevents the energization of the magnet solenoid 105 at this time and the rod 95 does not travel with the carriage. Other aspects of the dialing operation proceed as before with the stepping of switches KS2 and KS3 to their number five and four positions respectively and the advance of step switch KS1 to its number two position. However, it is noted that the fifth finger solenoid is not energized through switch KS2–1 because contact K2B remains open for the time being and similarly the open condition of contact K2E prevents relay K4 from being energized through the switch KS1–2 in the number two position.

When the carriage reaches the rear limiting position the rear limit switch 116a opens deenergizing relays K3 and K2. Relay K2, however, does not release for a short time because of the slow release operation due to the capacitor 124 previously noted. At the same time the rear limit switch 116b closes energizing the brake relay K5 momentarily through the diode 145 and the parallel combination of capacitor 146 and resistor 147. The dynamic brake is applied as before and the normally open contact K5F in the circuit of step switch KS1 is closed. However, the step switch KS1 is not operated because the contact K2F is held open until relay K2 releases and K2 does not drop out until after relay K5 drops out due to the charging of capacitor 146. When relay K2 does release, contact K2E closes energizing relay K4 through the number two position of switch KS1–2. Contact K4A therefore closes, rotating the motor in such a direction as to move the carriage forward away from its rear limiting position. At this time all of the apparatus is in the same condition as in the previously described cycle and the pack will be opened in the manner heretofore described.

It is possible for the operator to dial such a number that the pack will not be opened in the normal manner. For example, if the first digit dialed is greater than five, no finger will be extended since there are but five fingers. As another example, if the second digit dialed is greater than the number of columnar tabs in the particular drawer, the microswitches cannot operate switch deck KS4–1 a sufficient number of times to make it correspond with switch deck KS3–1. In either case no control power will be applied to conductor 126, and the carriage will not be stopped until it reaches the forward limit switch 117. A circuit is therefore provided to send the carriage to the rear position when it reaches the forward limit.

Assume that two digits have been dialed and that the carriage is moving forward normally with the forward relay K4 energized through the number two position of the sequence switch KS1–2 but that for some reason, such as one of the situations just mentioned, control power does not appear on the arm of switch KS4–1 and conductor 126 as it normally would when the proper position is reached. In any such case the carriage continues moving forward and when it reaches its most forward position, the forward limit switch 117 closes thereby energizing relay K6 which seals itself in through its normally open contacts K6A and the normally closed rear limit switch 116a. Contact K6C (FIG. 12a) opens thereby retracting any finger which may have been extended. At the same time the brake relay K5 is energized through diode 148 and the capacitor 146 thereby stopping the motor and advancing the step switch KS1 from the number two to the number three position. The switch deck KS1–2 therefore deenergizes relay K4 and energizes relay K3 which starts the carriage moving toward its rear position. The normally closed contact K6B having been opened, the magnet solenoid 105 is not energized and the rod 95 remains stationary. The microswitch 115 which is usually operated by movement of the rod therefore remains open and the carriage continues to its rear position. Upon reaching the rear position, the rear limit switch 116a is opened thereby deenergizing relay K6. At the same time the rear limit switch 116b is closed thereby operating the brake relay K5 which stops the motor and advances the sequence step switch KS1 to its number four position. The latter operation deenergizes relay K3 and energizes relay K1 which resets all of the step switches to zero and the carriage remains at the rear position.

The diodes 141, 142, 143 and 144 in the step switch resetting circuits and the diodes 127, 145, 148 and 134 in the brake relay circuits have been mentioned but their purpose has not been explained. These diodes are included to prevent faulty operation due to "sneak" circuits. For example, when the dial switch B closes and opens to operate step switch KS1, certain combinations of positions of the step switches KS1, KS2, KS3 and KS4 are possible whereby, in the absence of diodes 141–144, power could flow from the top of coil KS1, through the C and D contacts of KS1, the common conductor, and the C and D contacts of one or more of switches KS2, KS3 or KS4 which would operate these switches when operation is not desired. The diodes 141–144 prevent such faulty operation. As another example, when a voltage appears on conductor 126, it should charge capacitor 128 and energize relay K5 only. In the absence of diode 148, it is possible that sufficient current could flow from the top of relay coil K5, through capacitor 146 to energize relay K6. To prevent this and other similar malfunctions, the diodes 127, 145, 148 and 134 are included in each of the brake relay K5 operating circuits.

Although the invention has been described as applied to a specific embodiment it is obvious that many modifications will occur to those skilled in the art. It is therefore desired that the protection afforded by Letters Patent be limited only by the true scope of the appended claims.

What is claimed is:

1. Apparatus for opening a pack of record cards filed with a plurality of separator cards each having a portion extending above the record cards, comprising, a carriage for holding said cards, means for moving said carriage forward, means for sensing the forward passage of said portions of said separator cards through a predetermined region on the path of movement and for preventing passage of said portions in the reverse direction, and means responsive to a predetermined number of portions sensed for reversing the direction of movement of said carriage.

2. Apparatus for opening a pack of record cards filed with a plurality of separator cards each having a portion extending above the record cards, comprising, a carriage for holding said cards, means for moving said carriage forward, means for generating a signal upon the passage of each separator card beyond a predetermined point on the path of forward movement of said carriage, means for preventing backward movement of those separator cards which have passed said predetermined point, and means responsive to the generation of a predetermined number of signals for reversing the direction of movement of said carriage.

3. Apparatus for opening a pack of record cards filed with a plurality of separator cards each having a portion extending above the record cards, comprising, a carriage for holding said cards, a sensing mechanism mounted above said carriage for sensing the passage of each separator card therebeneath, means for moving said carriage forward beneath said mechanism, means including said sensing mechanism for preventing backward movement of the last separator card sensed by said mechanism, and means responsive to the sensing of a predetermined number of separator cards for stopping the forward motion of said carriage and for moving said carriage backward.

4. Apparatus for opening a pack of record cards filed with a plurality of separator cards each having a portion protruding above the record cards comprising, a carriage for holding said cards, a member mounted above said carriage and extending downward to the level of the separator cards, the mounting means for said member including a pivot permitting said member to rotate in an arc extending in one direction from its initial position yet preventing rotation in the other direction, means for moving said carriage in a first direction whereby said member is rotated each time it is engaged by a separator card, and means responsive to a predetermined number of rotations for reversing the motion of said carriage whereby the pack is opened by the engagement of said member by a separator card.

5. Apparatus for opening a pack of record cards filed with a plurality of separator cards each having a portion extending above the record cards, said portions being arranged in columns, comprising, a carriage for holding said cards, means for moving said carriage forward, means for generating a signal upon the passage of each separator card in any preselected column beyond a predetermined point on the path of forward movement of said carriage and for preventing backward movement of those separator cards which have passed said predetermined point, and means responsive to the generation of a predetermined number of signals for reversing the direction of movement of said carriage.

6. Apparatus for opening a pack of record cards filed with a plurality of separator cards each having a portion protruding above the record cards, comprising, a carriage for holding said cards, means for moving said carriage forward, a sensing mechanism mounted above said carriage and movable to either an extended or a retracted position, said mechanism when in its extended position sensing the passage of each separator card in the forward direction and preventing backward movement of the last separator card sensed, said mechanism being inactive when in its retracted position, means for extending said mechanism, means responsive to the sensing of a predetermined number of separator cards for stopping the forward motion of said carriage and for moving said carriage backward, means responsive to a first predetermined distance travelled backward by said carriage for retracting said mechanism, and means responsive to a second predetermined distance travelled backward by said carriage for stopping said carriage.

7. Apparatus for opening a pack of record cards filed with a plurality of separator cards each having a portion protruding above the record cards, comprising, a carriage for holding said cards, means for moving said carriage in a forward direction, a member mounted above said carriage, the mounting means for said member including first and second pivots, said member being movable about said first pivot to either an extended or a retracted position, said member when in its extended position extending downward to the level of said protruding portion of said separator cards and being rotatable about said second pivot away from said extended position in one direction only, whereby a separator card engaging said member while moving forward rotates said member and passes by while a separator card engaging said member while moving backward cannot rotate said member, said member being inactive when in its retracted position, means for moving said member to its extended position, means responsive to a predetermined number of rotations of said member by engagement of separator cards for reversing the direction of motion of said carriage, means responsive to a first predetermined distance travelled by said carriage since its reversal for retracting said member, and means responsive to a second predetermined distance travelled by said carriage since its reversal for stopping said carriage.

8. For use with record cards stored on edge in a drawer loosely enough so that the cards can remain in two portions, one sloping forward and the other sloping backward and including a plurality of separator cards interspersed among the record cards, each separator card having a portion protruding above the record cards, apparatus for dividing the cards into two portions behind any preselected separator card, comprising, a carriage for receiving the drawer of cards, motive means for moving said carriage longitudinally between a forward limit and a rear limit, a separator card sensing mechanism mounted above the path of movement of said carriage between said forward and rear limits high enough to permit the carriage to pass beneath, means for actuating said motive means to move said carriage from said rear limit toward said forward limit, means including said sensing mechanism for generating a signal for each separator card passing beneath said mechanism, means including said motive means responsive to a predetermined number of signals for stopping said carriage and reversing its direction of travel, means including said sensing mechanism for preventing backward motion of the last separator card to pass beneath whereby continued backward motion of said carriage causes the cards to be divided into two portions one sloping forward and the other sloping backward, means responsive to a first predetermined distance travelled by said carriage since its stoppage and reversal for disabling said backward motion preventing means, and means responsive to a second predetermined distance travelled by said carriage since its stoppage and reversal for stopping said carriage.

9. Apparatus according to claim 8 further comprising, a forward limit switch actuated by said carriage upon reaching said forward limit position, a rear limit switch actuated by said carriage upon reaching said rear limit position, means responsive to actuation of said forward limit switch for moving said carriage toward said rear limit position and means responsive to actuation of said rear limit switch for stopping said carriage.

10. For use with record cards stored on edge in a drawer loosely enough so that the cards can remain in two portions, one sloping forward and the other sloping backward, and including a plurality of separator cards interspersed among the record cards, each separator card having a tab protruding above the record cards with the tabs arranged in columns, apparatus for dividing the cards into two portions behind any preselected tab, comprising, a carriage for receiving the drawer of cards, motive means for moving said carriage longitudinally between a forward limit and a rear limit, a plurality of tab sensing mechanisms, one for each column of tabs, mounted above the path of movement of said carriage between said forward and rear limits high enough to permit the carriage to pass beneath, means for activating any one of said tab sensing mechanisms, means for actuating said motive means to move said carriage from said rear limit toward said forward limit, means including the activated sensing mechanism for generating a signal for each tab passing beneath, means including said motive means responsive to a predetermined number of signals from said activated tab sensing mechanism for stopping said carriage and reversing its direction of travel, means including said activated tab sensing mechanism for preventing backward motion of the last tab to pass beneath whereby continued backward motion of said carriage causes the pack of cards to be divided into two portions one sloping forward and the other sloping backward, means responsive to a first predetermined distance travelled by said carriage since its stoppage and reversal for deactivating said activated mechanism, and means responsive to a second predetermined distance travelled by said carriage since its stoppage and reversal for stopping said carriage.

11. For use with a pack of record cards filed with a plurality of separator cards each having a tab protruding above the record cards, said tabs being arranged in columns, apparatus for dividing said pack into two portions comprising, a carriage for holding said cards and moveable along a predetermined path between rear and forward limiting positions, means for selecting and storing a first digit representing the column containing the desired separator card, means for selecting and storing a second digit representing the position of the desired separator card in the selected column, a plurality of sensing mechanisms, one for each column of tabs, each having an active and an inactive position, each mechanism when activated generating a signal upon the passage of each tab of its associated column beyond a predetermined point on said path and also preventing backward movement of the last tab passing said point, means responsive to the selection of said first digit for activating that sensing mechanism corresponding to the desired column, means responsive to the selection of said second digit for moving said carriage to said rear limit position if it is not already there and in any event for moving said carriage from said rear limit position forward, means responsive to the generation by said activated mechanism of a number of signals equal to said second digit for reversing the direction of motion of said carriage whereby the pack is divided upon backward movement of said carriage, means responsive to travel by said carriage of a first predetermined distance since its last reversal for deactivating said previously activated mechanism, and means responsive to travel by said carriage of a second predetermined distance since its last reversal for stopping said carriage.

12. For use with a pack of record cards stored on edge loosely enough so that the cards can remain in two groups, one sloping forward and the other sloping backward, and including a plurality of separator cards interspersed among the record cards, each separator card having a tab protruding above the record cards with the tabs arranged in columns, apparatus for dividing the cards into two groups behind any preselected separator card, comprising, a carriage for holding the cards, motive means for moving said carriage along a path between a rear limit position and a forward limit position, means for selecting and storing a first digit representing the column containing the desired separator card, means for selecting and storing a second digit representing the number of the desired separator card in the selected column counted from the front of the pack of cards, a plurality of tab sensing mechanisms one for each column of tabs mounted above the path of movement of said carriage between said rear and forward limit positions high enough to permit said carriage to pass beneath, each of said mechanisms having an active and an inactive position, means operative when said carriage is in said rear limit position for moving that mechanism corresponding to said first digit to its active position, means operative upon selection of said second digit for actuating said motive means to move said carriage from said rear limit position toward said forward limit position, means for closing said pack so that all cards are in one group sloping backward, means including said active mechanism for generating a signal for each tab passing beneath said mechanism, means including said motive means responsive to the sensing by said active mechanism of a number of tabs corresponding to said second digit for reversing the direction of travel of said carriage, means including said active mechanism for preventing backward movement of the last tab sensed by said active mechanism whereby continued backward movement of said carriage causes said pack of cards to be divided into two groups, means responsive to a first predetermined distance travelled by said carriage since its reversal for moving said activated mechanism to its inactive position, and means responsive to a second predetermined distance travelled by said carriage since its reversal for stopping said carriage and releasing said digits from storage.

References Cited in the file of this patent
UNITED STATES PATENTS

| | | |
|---|---|---|
| 1,733,217 | Cox | Oct. 29, 1929 |
| 2,321,229 | Miller | June 8, 1943 |
| 3,055,131 | Novak | Sept. 25, 1962 |

FOREIGN PATENTS

| | | |
|---|---|---|
| 121,896 | Sweden | Apr. 15, 1948 |